United States Patent
Tamai et al.

(10) Patent No.: US 9,259,935 B2
(45) Date of Patent: Feb. 16, 2016

(54) INKJET RECORDER INK FLOW CHANNEL CLEANING LIQUID

(71) Applicants: Takashi Tamai, Kanagawa (JP); Michihiko Namba, Kanagawa (JP); Akihiko Gotoh, Kanagawa (JP)

(72) Inventors: Takashi Tamai, Kanagawa (JP); Michihiko Namba, Kanagawa (JP); Akihiko Gotoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/635,045

(22) Filed: Mar. 2, 2015

(65) Prior Publication Data

US 2015/0258796 A1  Sep. 17, 2015

(30) Foreign Application Priority Data

Mar. 13, 2014 (JP) ................................. 2014-050393
Oct. 8, 2014 (JP) ................................. 2014-207220

(51) Int. Cl.
  B41J 2/165 (2006.01)
(52) U.S. Cl.
  CPC .................. *B41J 2/16552* (2013.01)
(58) Field of Classification Search
  CPC ..... B41J 2/16552; C11D 3/24; C11D 3/2041; C11D 3/43
  USPC ....................... 347/28, 29; 510/170
  See application file for complete search history.

(56) References Cited

U.S. PATENT DOCUMENTS

2011/0012956 A1 * 1/2011 Kagata et al. .................. 347/29
2013/0194345 A1   8/2013 Tamai et al.

FOREIGN PATENT DOCUMENTS

| JP | 2011-255566 | 12/2011 |
| JP | 2013-141783 | 7/2013 |
| JP | 2013141783 | * 7/2013 |

* cited by examiner

Primary Examiner — Julian Huffman
Assistant Examiner — Carlos A Martinez
(74) Attorney, Agent, or Firm — Cooper & Dunham LLP

(57) ABSTRACT

A cleaning liquid used for cleaning an ink flow channel in an inkjet recorder includes water; a hydrosoluble organic solvent; a compound having the following formula (1):

$$C_6F_{13}CH_2CH_2O{\text{-}}(CH_2CH_2O)_n{\text{-}}H \quad (1)$$

wherein n represents an integer of from 1 to 40; and a compound having the following formula (2):

$$\underset{R_3}{\overset{R_1}{\text{HO}{-}\underset{|}{\overset{|}{C}}{-}(CH_2)_n{-}\underset{|}{\overset{|}{C}}{-}\text{OH}}}\underset{R_4}{\overset{R_2}{}} \quad (2)$$

wherein $R_1$ and $R_2$ independently represent an alkyl group having 3 to 6 carbon atoms; $R_3$ and $R_4$ independently represent a methyl group or an ethyl group; and n represents an integer of from 1 to 6.

6 Claims, 3 Drawing Sheets

INKJET RECORDER INK FLOW CHANNEL CLEANING LIQUID

CROSS-REFERENCE TO RELATED APPLICATIONS

This patent application is based on and claims priority pursuant to 35 U.S.C. §119 to Japanese Patent Applications Nos. 2014-050393 and 2014-207220, filed on Mar. 13, 2014 and Oct. 8, 2014, respectively in the Japan Patent Office, the entire disclosure of which is hereby incorporated by reference herein.

BACKGROUND

1. Technical Field

The present invention relates to a cleaning liquid for cleaning an ink flow channel of an inkjet head, a cartridge containing the cleaning liquid and a method of cleaning the ink flow channel using the cleaning liquid.

2. Description of the Related Art

An inkjet head is composed of a nozzle with orifice, having a diameter not more than 50 μm, a pressure generator, a liquid container, a filter, and so on. Each component is processed precisely and therefore each inkjet head has multiple inkjet nozzles. Therefore, before shipping, the inkjet head is tested with test ink to ensure that all the components work normally and not result in a jetting failure. The ink flow channel needs cleaning in order that an ink filled therein does not leak out to contaminate the surroundings.

Conventionally, water or an aqueous solution of surfactant has been used.

However, the ink is not sufficiently cleaned, the ink does not have sufficient filling ability, and the ink does not have sufficient defoamability.

Japanese published unexamined application No. JP-2013-141783-A discloses a cleaning and filling liquid for a liquid flow channel in an inkjet recorder and an ink cartridge used therein. The cleaning and filling liquid includes at least one compound having the following formula (1) in an amount of from 0.01 to 1.0% by weight, a fluorine surfactant in an amount of from 0.01 to 1.0% by weight, a hydrosoluble organic solvent and water.

SUMMARY

Accordingly, one object of the present invention is to provide a cleaning liquid for an ink to have good cleanability, filling ability and defoamability.

Another object of the present invention is to provide a cartridge containing the cleaning liquid.

A further object of the present invention is to provide a method of cleaning the ink flow channel using the cleaning liquid.

These objects and other objects of the present invention, either individually or collectively, have been satisfied by the discovery of a cleaning liquid used for cleaning an ink flow channel in an inkjet recorder, including water; a hydrosoluble organic solvent; a compound having the following formula (1):

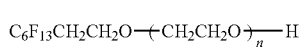

(1)

wherein n represents an integer of from 1 to 40; and a compound having the following formula (2):

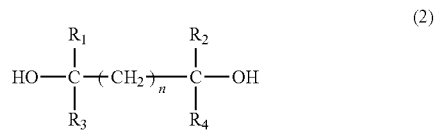

wherein $R_1$ and $R_2$ independently represent an alkyl group having 3 to 6 carbon atoms; $R_3$ and $R_4$ independently represent a methyl group or an ethyl group; and n represents an integer of from 1 to 6.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
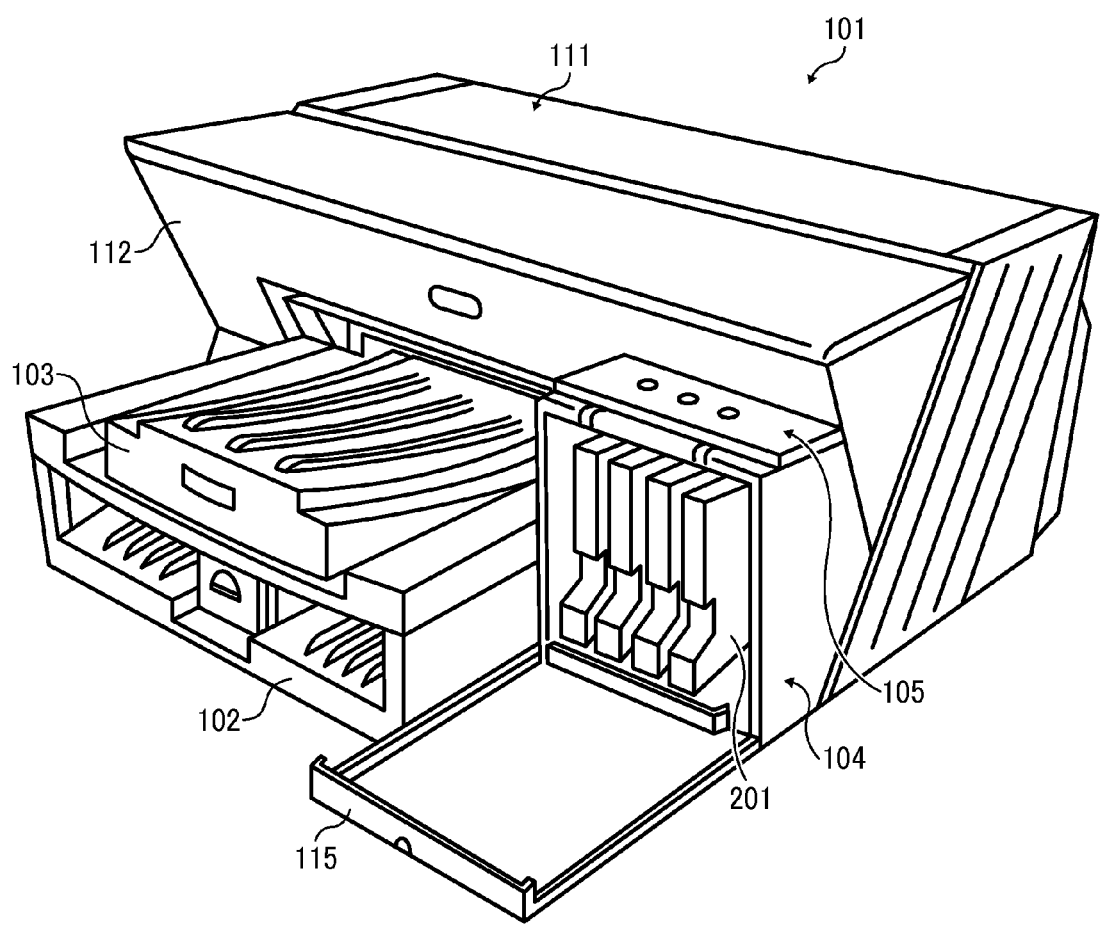
FIG. 1 is a perspective view illustrating an embodiment of inkjet recorder.

The present invention provides a cleaning liquid for an ink to have good cleanability, filling ability and defoamability.

The cleaning liquid is used for cleaning an ink flow channel of an inkjet recorder and includes water, a hydrosoluble organic solvent, a compound having the formula (1) and a compound having the formula (2). Including the compound having the formula (1), the cleaning liquid has good cleanability of an ink, having both permeability permeating an ink filled in the ink flow channel and dispersibility holding dispersion of a pigment in an ink. Further, including the compound having the formula (2), the cleaning liquid has good defoamability to prevent an ink from poorly discharging due to foams after filling the ink, and good ink filling ability.

Marketed products of the compounds having the formula (1) in which distributions of n are different include Capstone (Trademarks) FS-30, FS-3100 and FS-34 from Du Pont, etc.

The distributions of n in the compounds having the formula (1) can be measured by NMR and weight analysis.

The cleaning liquid typically includes the compound having the formula (1) in an amount of from 0.01 to 2% by weight, preferably from 0.05 to 1% by weight, and more preferably from 0.1 to 0.5% by weight.

The cleaning liquid including the compound having the formula (1) in an amount of from 0.01 to 2% by weight improves in cleanability and does not become clouded because the compound is not dissolved.

The compound having the formula (2) is not particularly limited, but includes 2,4,7,9-tetramethyl-4,7-decanediol, etc.

The cleaning liquid typically includes the compound having the formula (2) in an amount of from 0.01 to 2% by weight, and preferably from 0.1 to 0.5% by weight. The cleaning liquid including the compound having the formula (2) in an amount of from 0.1 to 0.5% by weight improves filling ability of an ink and prevents a pigment from agglutinating when contacting an ink.

Specific examples of the hydrosoluble organic solvent include, but are not limited to, polyhydroxy alcohols such as ethylene glycol, diethylene glycol, triethylene glycol, polyethylene glycol, polypropylene glycol, 1,3-butanediol, 3-methyl-1,3-butanediol, 1,5-pentanediol, 1,6-hexanediol, glycerin, diglycerin, 1,2,3-butanetriol, 1,2,4-butanetriol, 1,2,6-hexanetriol, and petriol; polyhydroxy alcohol alkyl ethers such as ethyleneglycolmonoethylether, ethyleneglycolmonobutylether, diethyleneglycolmonomethylether, diethyleneglycolmonoethylether, diethyleneglycolmonobuthylether, tetraethyleneglycolmonomethylether, and propyleneglycolmonoethylether; polyhydroxy alcohol aryl ethers such as ethyleneglycolmonophenylether, and ethyleneglycolmonobenzilether; nitrogen-containing heterocyclic compounds such as N-methyl-2-pyrolidone, N-hydroxyethyl-2-pyrolidone, 2-pyrolidone, 1,3-dimethylimidazolidinone, and .epsilon.-caprolactam; amides such as formamide, N-methylformamide, and N,N-dimethylformamide; amines such as monoethanolamine, diethanolamine, triethanolamine, monoethylamine, diethylamine, and triethylamine; sulfur-containing compounds such as dimethylsulfoxide, sulfolane, and thio-diethanol; propylene carbonate, ethylene carbonate, and γ-butyrolactone. These can be used alone or in combination. Particularly, polyols including an equilibrium water in an amount not less than 30% by weight at a temperature of 23° C. and a humidity of 80% RH are preferably used because of preventing the cleaning liquid from increasing viscosity even when water evaporates therefrom.

Specific examples of the polyols including an equilibrium water in an amount not less than 30% by weight at a temperature of 23° C. and a humidity of 80% RH include, but are not limited to, 1,2,3-butanetriol, 1,2,4-butanetriol, glycerin, diglycerin, diethylene glycol, triethylene glycol, tetraethylene glycol, and 1,3-butanediol. Of these, glycerin is preferably used.

The cleaning liquid typically includes the hydrosoluble organic solvent in an amount of from 5 to 20% by weight.

The cleaning liquid may further include a surfactant, a pH regulator, an antiseptic and antifungal agent, etc. besides the compounds having the formulae (1) and (2).

Specific examples of the surfactant include, but are not limited to, a fluorochemical surfactant, an anionic surfactant, a cationic surfactant, a nonionic surfactant, and an amphoteric surfactant.

Specific examples of the fluorochemical surfactant include, but are not limited to, a compound having the following formula:

dently represent a perfluoroalkyl group having 1 to 6 carbon atoms; m and n independently represent an integer not less than 0; and p and q independently represent an integer not less than 1.

Specific examples of the anionic surfactant include, but are not limited to, alkylaryl sulfonates, alkyl phosphates, alkyl sulfates, alkyl sulfonates, alkylethersulfates, alkyl sulfosuccinates, alkylestersulfates, alkylbenzenesulfonates, alkyldiphenylether disulfonates, alkylarylether phosphates, alkylarylether sulfates, alkylarylether ester sulfates, olefin sulfonates, alkane olefin sulfonates, polyoxyethylene alkylether phosphates, polyoxyethylene alkylether sulfates, ether carboxylates, sulfosuccinates, α-sulfo fatty acid esters, fatty acid salts, condensation products of higher fatty acids and amino acids, and naphthenates.

Specific examples of the cationic surfactant include, but are not limited to, alkyl amine salts, dialkyl amine salts, aliphatic amine salts, benzalkonium salts, quaternary ammonium salts, alkyl pyridinium salts, imidazolinium salts, sulfonium salts, and phosphonium salts.

Specific examples of the nonionic surfactant include, but are not limited to, polyoxyethylene alkyl ethers, polyoxyethylene alkylallyl ethers, polyoxyethylene alkylphenyl ethers, polyoxyethylene glycol esters, polyoxyethylene fatty acid amides, polyoxyethylene fatty acid esters, polyoxyethylene polyoxypropylene glycol, glycerin esters, sorbitan esters, sucrose esters, polyoxyethylene ethers of glycerin esters, polyoxyethylene ethers of sorbitan esters, polyoxyethylene ethers of sorbitol esters, fatty acid alkanolamides, amine oxides, polyoxyethylene alkylamines, glycerin fatty acid esters, sorbitan fatty acid esters, polyoxyethylene sorbitan fatty acid esters and alkyl(poly)glycoxides.

Specific examples of the amphoteric surfactant include, but are not limited to, imidazoline derivatives such as imidazolinium betaine, dimethyl alkyl lauryl betaines, alkylglycines, and alkyldi(aminoethyl)glycines.

Specific examples of the pH regulator include, but are not limited to, hydroxides of alkali metal such as lithium hydroxide, sodium hydroxide, and potassium hydroxide; carbonates of alkali metal such as lithium carbonate, sodium carbonate, and potassium carbonate; amines such as quaternary ammonium hydroxide, diethanolamine and triethanolamine; ammonium hydroxide, and quaternary phosphonium hydroxide.

Specific examples of the antiseptic and antifungal agent include, but are not limited to, 1,2-benzisothiazoline-3-on, sodium benzoate, sodium dehydroacetate, sodium sorbate, sodium pentachlorophenol, and sodium 2-pyridinethiol-1-oxide.

FIG. 1 is a perspective view illustrating an embodiment of inkjet recorder.

The inkjet recorder in FIG. 1 includes an apparatus body 101, a feeder tray 102 attached to the apparatus body 101 for feeding papers, a paper output tray 103 attached to the apparatus body 101 for receiving papers on which images are recorded or formed, and an ink cartridge mounting part 104.

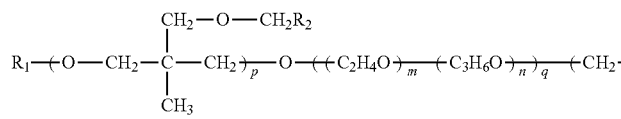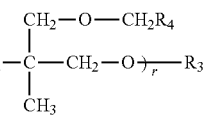

wherein $R_1$ and $R_3$ independently represent a hydrogen atom, an alkoxy group having 1 to 6 carbon atoms or a perfluoroalkyl group having 1 to 6 carbon atoms; $R_2$ and $R_4$ indepen- An operation part 105 having operation keys and indicators is provided on the top surface of the ink cartridge mounting part 104. The ink cartridge mounting part 104 has front cover 115 that can be opened or closed to remove or place ink cartridges 201. In addition, the apparatus body 101 has an upside cover 111 and a forehead of the front cover 112.

Figure 2:
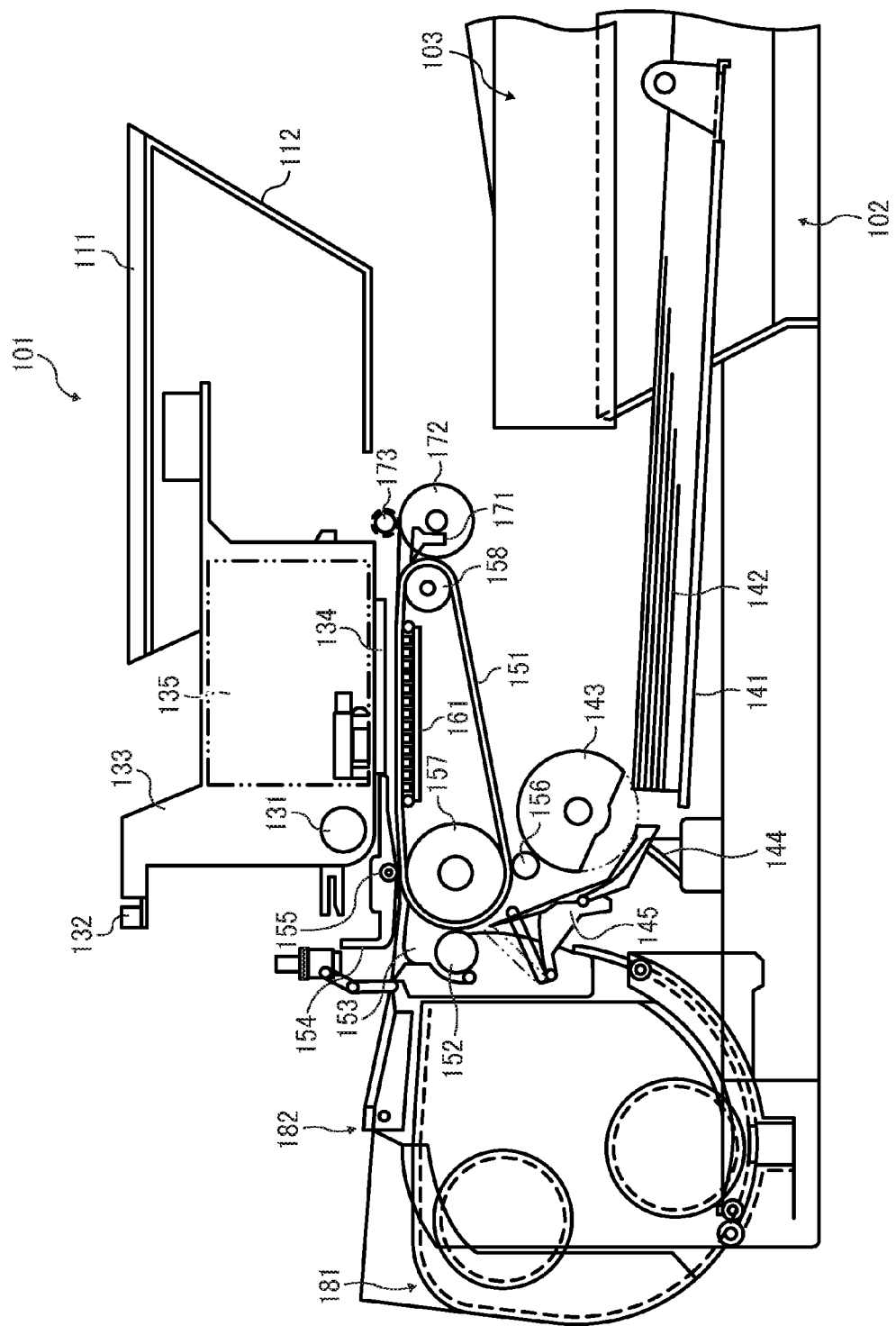
FIG. 2 is a schematic view illustrating the whole configuration of the inkjet recorder in FIG. 1.
Figure 3:
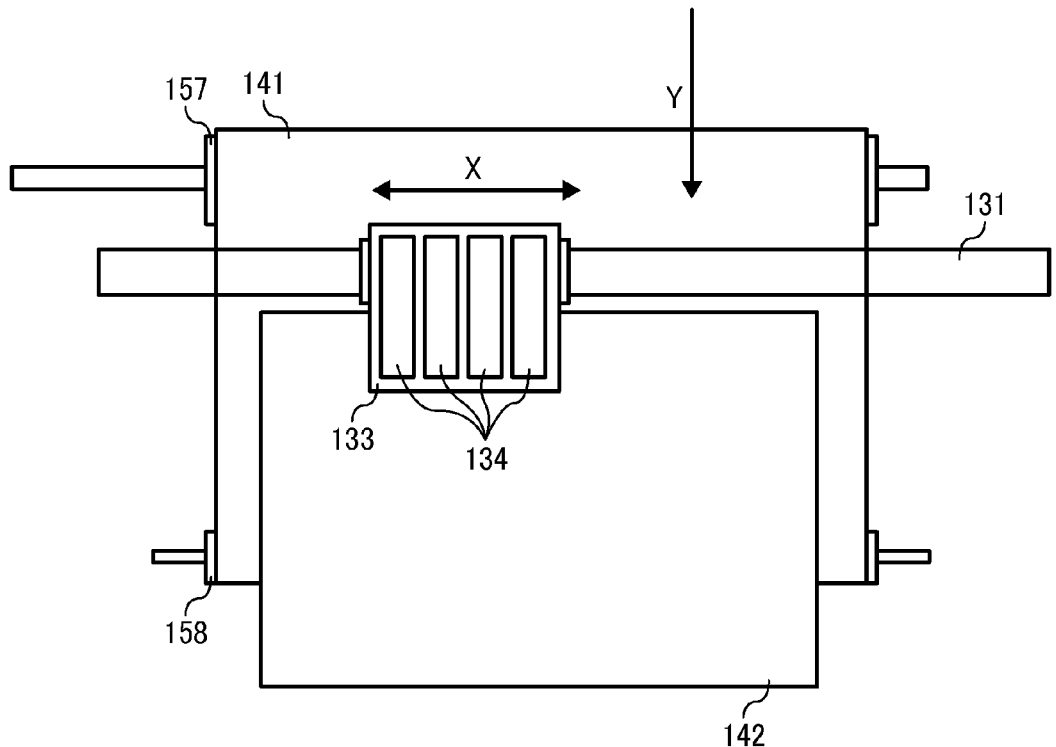
FIG. 3 is a schematic amplified view illustrating an inkjet head of the inkjet recorder in FIG. 1.
Figure 4:
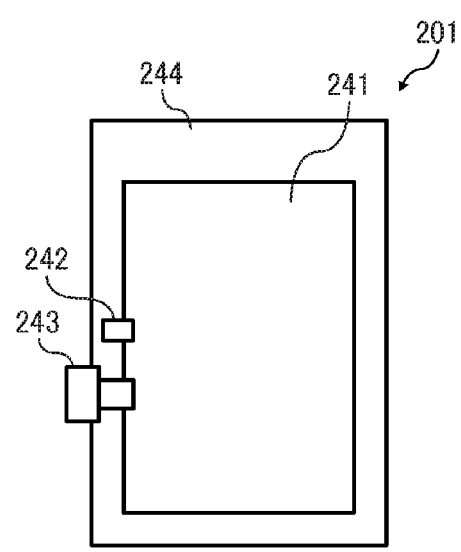
FIG. 4 is a schematic view illustrating an ink cartridge in the inkjet recorder in FIG. 1.

As shown in FIGS. 2 to 3, a carriage 133 is supported slidably in the scan direction by guide rod 131 that is a guide member laid across right and left side plates and stay 132 and moved by a main motor in the arrowed directions (X) for scanning within the apparatus body 101.

Recording heads 134 including four inkjet recording heads that eject yellow (Y), cyan (C), magenta (M), and black (B) recording ink droplets, respectively, have ink ejection ports arranged in the intersecting direction with the main scanning direction and they are placed in the carriage 133 with their ink ejection direction downward.

Inkjet recording heads constituting the recording heads 134 are provided with an energy generation unit for ejection the ink such as a piezoelectric actuator such as an piezoelectric element, a thermal actuator using an electrothermal conversion element such as an exothermic resistor to cause film boiling and, accordingly, phase change of a liquid, a shape-memory alloy actuator using metal phase changes due to temperature changes, and an electrostatic actuator using electrostatic force.

The carriage 133 is provided with subtanks 135 for supplying each color ink to the recording heads 134. The subtanks 135 are filled with the ink according to the present invention from the ink cartridge 201 mounted in the ink cartridge mounting part 105 via an ink supply tube.

A paper feed part for feeding paper 142 stuck on paper load part 141, i.e. platen, of the feed tray 102 includes a half-moon roller, i.e. feed roller 143, that separates and supplies the paper 142 from the paper load part 141 one by one and separation pad 144 that faces the feed roller 143 and is made of a large friction coefficient material. The separation pad 144 is biased toward the feed roller 143.

A conveying part for conveying the paper 142 supplied from the feed part underneath the recording heads 134 includes a conveying belt 151 for electrostatically adsorbing and conveying the paper 142, counter roller 152 for conveying the paper 142 sent from the paper feed part via guide 145 by clamping it together with the conveying belts 151, conveying guide 153 for turning the paper 142 sent nearly vertically by 90° so as to lay it on the conveying belt 151, and leading end pressure roller 155 that is biased toward the conveying belt 151 by presser member 154. A charging roller 156 that is a charging unit for charging the surface of the conveying belt 151 is also provided.

The conveying belt 151 is an endless belt, being placed over conveying roller 157 and a tension roller 158 and running around in the belt conveying direction (Y). For example, the conveying belt 151 has a front layer that is a paper adsorbing surface made of a dragging-uncontrolled resin, for example a copolymer of tetrafluoroethylene and ethylene (ETFE), having a thickness of 40 nm, and a back layer, i.e. an intermediate dragging layer or an earth layer, made of the same material as the front layer, but dragging-controlled with carbon. A guide member 161 is provided behind the conveying belt 151 at the corresponding position to the printing area by the recording heads 134. An output part for discharging the paper 142 on which recording was done by the recording heads 134 includes a separation click 171 for separating the paper 142 from the conveying belt 151, a paper output roller 172, and paper output roller 173. A paper output tray 103 is disposed below the paper output roller 172.

Double-side feeding unit 181 is detachably mounted in the back of the apparatus body 101. The double-side feed unit 181 takes in the paper 142 that is moved backward as the conveying belt 151 is rotated in the reverse direction, turns it over, and feeds it again between the counter roller 152 and the conveying belt 151. A manual feeder 182 is provided on the top surface of the double-side feed unit 181.

In this inkjet recorder, the paper 142 is separated and fed from the paper feed part one by one. Being fed vertically, the paper 142 is guided by the guide 145 and conveyed between the conveying belt 151 and the counter roller 152. Then, it is guided by the conveying guide 153 at the leading end and is pressed against the conveying belt 151 by the leading end pressure roller 155 to change the convey direction substantially by 90°.

Meanwhile, the conveying belt 151 is charged by the charging roller 156, and the paper 142 is electrostatically adsorbed and conveyed by the conveying belt 151. Then, the recording heads 134 are driven according to image signals while the carriage 133 is moved. Ink droplets are ejected on the paused paper 142 for recording one-line. Then, the paper 142 is conveyed by a certain rate for recording the next line. Receiving a recording end signal or a signal indicating the rear end of the paper 142 has reached the recording area, the recording operation is terminated and the paper 142 is ejected to the paper output tray 103.

When it is detected that the remaining amount of the recording ink in the subtank 135 is nearly to the end, a certain amount of recording ink is supplied to the subtank 135 from the ink cartridge 201.

In this inkjet recorder, when the recording ink in the ink cartridge 201 is used up, the case of the ink cartridge 201 is disassembled and only the ink pouch contained therein can be exchanged. The ink cartridge 201 allows for stable recording ink supply even in a vertical and front mounting structure. Therefore, when the apparatus body 101 is installed with the top being blocked by something, for example, the ink cartridge 201 can be housed in a rack. Even if something is placed on the top surface of the apparatus body 101, the ink cartridge 201 can be easily replaced.

Here, the explanation is made with reference to an application in a serial type, i.e. shuttle type, inkjet recording apparatus in which the carriage scans is described. A line type inkjet recording apparatus having a line head is also applicable.

The inkjet ink of the embodiment is applicable to various recording in an inkjet recording system such as inkjet recording printers, facsimiles, copy machines, and printer/fax/copy complex machines.

A process of providing the cleaning liquid in the ink flow channel and exhausting it therefrom is repeated to clean the ink flow channel of the inkjet recorder.

Methods of cleaning the ink flow channel of the inkjet recorder include, but are not particularly limited to, a method of replacing the ink cartridge 201 with a cartridge filled with the cleaning liquid and repeating a process of providing the cleaning liquid in the ink flow channel and exhausting it therefrom is repeated to clean the ink flow channel, a method of providing the cleaning liquid in the ink flow channel with pressure from outside, and a method of absorbing the cleaning liquid from the inkjet head 134 side with a pump.

A fine oscillation may be applied to the ink flow channel by the inkjet head 134 to clean the ink flow channel of the inkjet recorder. This improves cleanability of the cleaning liquid.

Further, after the ink flow channel of the inkjet recorder is cleaned, the ink flow channel may be filled with the cleaning liquid when necessary.

Next, the ink filled in the ink flow channel is explained.

The ink typically includes a colorant, water, a hydrosoluble organic solvent, and a surfactant, and may further include other additives such as a PH regulator, an antiseptic and antifungal agent, an antirust agent, a hydrosoluble UV absorber, and a hydrosoluble IR absorber.

Known pigments and dyes can be used as the colorant.

Specific examples of inorganic pigments include, but are not limited to, titanium oxide, iron oxide, calcium carbonate, barium sulfate, aluminum hydroxide, barium yellow, cadmium red, chrome yellow, and carbon blacks manufactured by publicly known method such as contact method, thermal method, and furnace method.

Specific examples of organic pigments include, but are not limited to, azo pigments including azo lake pigment, insoluble azo pigment, condensed azo pigment, chelate azo pigment; polycyclic pigments such as phthalocyanine pigment, perylene pigment, perinone pigments, anthraquinone pigments, quinacridone pigments, dioxazine pigments, indigo pigments, thioindigo pigments, isoindolinone pigments and quinophthalone pigments; dye chelates including basic dye chelates and acidic dye chelates; nitro pigments; nitroso pigments; and aniline black.

Self-dispersion type pigment having functional groups such as sulfone group and carboxyl group on surface thereof to be able to disperse in water may be used. Also, pigments that are microencapsulated to be able to disperse in water may be used.

The ink typically includes a pigment in an amount of from 0.5 to 25% by weight, and preferably from 2 to 15% by weight.

The pigment typically has a mode diameter of from 20 to 150 nm. When greater than 150 nm, the ink may deteriorate in storage stability and discharge stability, and produce images having lower image density. It is difficult to produce a pigment having a mode diameter less than 20 nm.

Known dispersants such as polymer dispersants or hydrosoluble surfactants may be used to disperse a pigment.

The ink may include a resin for improving image fixability, image quality, and pigment dispersibility.

Specific examples of the resin include, but are not limited to, vegetable polymers such as gum acacia, tragacanth gum, guar gum, karaya gum, locust bean gum, arabinogalactan, pectin and quince seed starch; sea weed polymers such as alginic acid, carrageenan and agar; animal polymers such as gelatin, casein, albumin and collagen; and microbial polymers such as xanthene gum and dextran; as semi-synthetic polymers, cellulose polymers such as methylcellulose, ethylcellulose, hydroxyethylcellulose, hydroxypropyl cellulose and carboxymethylcellulose; starch polymers such as sodium starch glycolate and sodium starch phosphate ester; and sea weed polymers such as sodium alginate and alginate propylene glycol ester; and as pure synthetic polymers, vinyl polymers such as polyacrylic acid, polymethacrylic acid, acrylic acid-acrylonitrile copolymer, vinyl acetate-acrylic acid ester copolymer, vinyl acetate-acrylic acid alkyl ester copolymer, styrene-acrylic acid copolymer, styrene-methacrylic acid copolymer, styrene-acrylic acid-acrylic acid alkyl ester copolymer, styrene-methacrylic acid-acrylic acid alkyl ester copolymer, styrene-α-methylstyrene-acrylic acid copolymer, acrylic acid alkyl ester copolymer, styrene-maleic acid copolymer, vinyl naphthalene maleic acid copolymer, vinyl acetate-ethylene copolymer, vinyl acetate-fatty acid vinyl ethylene copolymer, vinyl acetate-maleic acid ester copolymer, vinyl acetate-crotonic acid copolymer, and vinyl acetate-acrylic acid copolymer; and salt thereof.

The resin may be a resin emulsion.

The resin emulsion is a dispersion in which a particulate resin is dispersed in water, and may include a dispersant such as surfactant when necessary.

The resin emulsion typically includes the particulate resin in an amount of from 10 to 70% by weight.

The particulate resin typically has an average particle diameter of from 10 to 1,000 nm, and preferably from 20 to 300 nm.

Specific examples of the particulate resin include, but are not particularly limited to, acrylic resins, vinyl acetate resins, styrene resins, butadiene resins, styrene-butadiene resins, vinyl chloride resins, acrylic/styrene resins and acrylic silicone resins. Among them, the acrylic silicone resins are preferably used.

Specific examples of the commercially available resin emulsion include, but are not limited to, Micro Gel E-100, E-2002, and E-5002 (styrene-acrylic resin emulsion, product of NIPPON PAINT Co., Ltd.), Boncoat 5454 (styrene-acrylic resin emulsion, product of Dainippon Ink and Chemicals Inc.), JONCRYL 775 (styrene-acrylic resin emulsion, product of Johnson polymer), SAE-1014 (styrene-acrylic resin emulsion, product of ZEON CORPORATION), Saibinol SK-200 (acrylic resin emulsion, product of Saiden Chemical Industry Co., Ltd.), Primal AC-22, AC-61 (acrylic resin emulsion, product of Rohm and Haas Company), NANOCRYL SBCX-2821, 3689 (acrylic silicone resin emulsion, product of TOYO INK MFG. CO. LTD.), and #3070 (methyl methacrylate polymer resin emulsion, product of Mikuni Color Ltd.).

The ink typically includes the particulate resin in an amount of from 0.1 to 50% by weight, preferably from 0.5 to 20% by weight, and more preferably from 1 to 10% by weight.

The hydrosoluble organic solvent, the surfactant, the PH regulator, and the antiseptic and antifungal agent are the same as those of the cleaning liquid.

The ink is prepared by dispersing or dissolving a composition including the colorant, the hydrosoluble organic solvent and the surfactant in water.

Dispersers used for dispersing or dissolving the composition include, but are not particularly limited to, a sand mill, a homogenizer, a ball mill, a paint shaker, and an ultrasonic disperser.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

<Preparation of Polymer Solution>

The interior of a 1-L flask equipped with a mechanical stirrer, a thermometer, a nitrogen gas introduction tube, a reflux tube, and a dropping funnel was satisfactorily replaced by nitrogen gas. The flask was charged with 11.2 g of styrene, 2.8 g of acrylic acid, 12.0 g of lauryl methacrylate, 4.0 g of polyethylene glycol methacrylate, 4.0 g of styrene macromer, 0.4 g of mercapto ethanol, and 40.0 g of methyl ethyl ketone, and the temperature of the flask was raised to 65° C. A liquid mixture including 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobismethylvaleronitrile, and 342.0 g of methyl ethyl ketone was then added dropwise into the flask over a period of 2.5 hrs. After the completion of the dropwise addition, a mixed solution composed of 0.8 g of azobismethylvaleronitrile and 18 g of methyl ethyl ketone was added dropwise into the flask over a period of 0.5 hrs. The mixture was aged for 1 hr. To the resultant, 0.8 g of azobismethylvaleronitrile was then added, and the resulting mixture was aged for additional 1 hr. After the completion of the reaction, 800 g of a polymer solution having a concentration of 50% by weight was obtained.

<Preparation of Yellow Pigment Ink>

The polymer solution synthesized above (28 g), 26 g of Pigment Yellow 74, 13.6 g of 1 mol/L potassium hydroxide aqueous solution, 20 g of methyl ethyl ketone, and 13.6 g of ion exchanged water were satisfactorily stirred, and the mixture was then kneaded with a roll mill. The resultant paste was introduced into 200 g of purified water, and the mixture was satisfactorily stirred. Methyl ethyl ketone and water were removed by distillation with an evaporator to obtain polymer fine particle dispersion liquid including yellow pigment having pigment content of 15% by weight and solid content of 20% by weight.

15 parts of 1,3-butanediol, 15 parts of glycerin, 1 part of Poly Fox PF-151N manufactured by OMNOVA, and 2 parts of octanediol were satisfactory mixed for 1 hour. Then, the 40 parts of the polymer fine particle dispersion liquid including yellow pigment was added to the mixture, and then water was added to the mixture such that the whole amount becomes 100% by weight. Next, the mixture was mixed for 1 hour. Then large particles were removed from the mixture by pressure filtration using 0.8 μm cellulose acetate membrane filter, to obtain yellow pigment ink.

<Preparation of Magenta Pigment Ink>

The polymer solution synthesized above (17.5 g), 32.5 g of C.I. Pigment Red 122, 8.5 g of 1 mol/L potassium hydroxide aqueous solution, 13 g of methyl ethyl ketone, and 13.6 g of ion exchanged water were satisfactorily stirred, and the mixture was then kneaded with a roll mill. The resultant paste was introduced into 200 g of purified water, and the mixture was satisfactorily stirred. Methyl ethyl ketone and water were removed by distillation with an evaporator to obtain polymer fine particle dispersion liquid including magenta pigment having pigment content of 15% by weight and solid content of 20% by weight.

15 parts of 3-methyl-1,3-butanediol, 15 parts of glycerin, 0.5 b parts of Zonyl FSO-100 manufactured by Du Pont, and 1 part of 1,2-hexanediol were satisfactory mixed for 1 hour. Then, the 40 parts of the polymer fine particle dispersion liquid including magenta pigment was added to the mixture, and then water was added to the mixture such that the whole amount becomes 100% by weight. Next, the mixture was mixed for 1 hour. Then large particles were removed from the mixture by pressure filtration using 0.8 μm cellulose acetate membrane filter, to obtain magenta ink.

Example 1

0.5 parts of a fluorochemical nonionic surfactant Capstone (Trademarks) FS-3100 having the formula (1) in which n is from 7 to 17 from Du Pont, 0.1 parts of 2,4,7,9-tetramethyl-4,7-decanediol, 5 parts of glycerin, 20 parts of 1,3-butanediol and 74.4 parts of water were mixed to obtain a cleaning liquid.

Example 2

0.1 parts of a fluorochemical nonionic surfactant Capstone (Trademarks) FS-3100 having the formula (1) in which n is from 7 to 17 from Du Pont, 0.4 parts of 2,4,7,9-tetramethyl-4,7-decanediol, 15 parts of glycerin, 15 parts of 1,3-butanediol and 69.5 parts of water were mixed to obtain a cleaning liquid.

Example 3

1 part of a fluorochemical nonionic surfactant Capstone (Trademarks) FS-3100 having the formula (1) in which n is from 7 to 17 from Du Pont, 0.2 parts of 2,4,7,9-tetramethyl-4,7-decanediol, 20 parts of glycerin, 5 parts of diethylene glycol and 73.8 parts of water were mixed to obtain a cleaning liquid.

Example 4

0.01 parts of a fluorochemical nonionic surfactant Capstone (Trademarks) FS-3100 having the formula (1) in which n is from 7 to 17 from Du Pont, 0.2 parts of 2,4,7,9-tetramethyl-4,7-decanediol, 15 parts of glycerin, 15 parts of 1,3-butanediol and 69.79 parts of water were mixed to obtain a cleaning liquid.

Example 5

0.05 parts of a fluorochemical nonionic surfactant Capstone (Trademarks) FS-3100 having the formula (1) in which n is from 7 to 17 from Du Pont, 0.5 parts of 2,4,7,9-tetramethyl-4,7-decanediol, 5 parts of glycerin, 10 parts of 1,3-butanediol, 5 parts of 2-pyorllidone and 79.45 parts of water were mixed to obtain a cleaning liquid.

Example 6

0.05 parts of a fluorochemical nonionic surfactant Capstone (Trademarks) FS-3100 having the formula (1) in which n is from 7 to 17 from Du Pont, 0.6 parts of 2,4,7,9-tetramethyl-4,7-decanediol, 5 parts of glycerin, 10 parts of 1,3-butanediol, 2 parts of 1,8-octanediol and 82.35 parts of water were mixed to obtain a cleaning liquid.

Example 7

1.25 parts of a fluorochemical nonionic surfactant Capstone (Trademarks) FS-3100 having the formula (1) in which n is from 7 to 17 from Du Pont, 1 part of 2,4,7,9-tetramethyl-4,7-decanediol, 15 parts of glycerin, 15 parts of 1,3-butanediol and 67.75 parts of water were mixed to obtain a cleaning liquid.

Example 8

0.75 parts of a fluorochemical nonionic surfactant Capstone (Trademarks) FS-3100 having the formula (1) in which n is from 7 to 17 from Du Pont, 0.55 parts of 2,4,7,9-tetramethyl-4,7-decanediol, 10 parts of glycerin, 15 parts of 3-methyl-1,3-butanediol, 5 parts of 2-pyorllidone and 68.7 parts of water were mixed to obtain a cleaning liquid.

Example 9

2 parts of a fluorochemical nonionic surfactant Capstone (Trademarks) FS-3100 having the formula (1) in which n is from 7 to 17 from Du Pont, 0.08 parts of 2,4,7,9-tetramethyl-4,7-decanediol, 5 parts of glycerin, 10 parts of 1,3-butanediol, 5 parts of 2-pyorllidone and 77.92 parts of water were mixed to obtain a cleaning liquid.

Example 10

0.5 parts of a fluorochemical nonionic surfactant Capstone (Trademarks) FS-34 having the formula (1) in which n is from 5 to 20 from Du Pont, 0.1 parts of 2,4,7,9-tetramethyl-4,7-decanediol, 5 parts of glycerin, 20 parts of 1,3-butanediol and 74.4 parts of water were mixed to obtain a cleaning liquid.

Example 11

0.1 parts of a fluorochemical nonionic surfactant Capstone (Trademarks) FS-34 having the formula (1) in which n is from 5 to 20 from Du Pont, 0.4 parts of 2,4,7,9-tetramethyl-4,7-decanediol, 15 parts of glycerin, 15 parts of 1,3-butanediol and 69.5 parts of water were mixed to obtain a cleaning liquid.

Example 12

1 part of a fluorochemical nonionic surfactant Capstone (Trademarks) FS-34 having the formula (1) in which n is from 5 to 20 from Du Pont, 0.2 parts of 2,4,7,9-tetramethyl-4,7-decanediol, 20 parts of glycerin, 5 parts of diethylene glycol and 73.8 parts of water were mixed to obtain a cleaning liquid.

Example 13

0.01 parts of a fluorochemical nonionic surfactant Capstone (Trademarks) FS-34 having the formula (1) in which n is from 5 to 20 from Du Pont, 0.2 parts of 2,4,7,9-tetramethyl-4,7-decanediol, 15 parts of glycerin, 15 parts of 3-merthyl-1,3-butanediol and 69.79 parts of water were mixed to obtain a cleaning liquid.

Example 14

0.05 parts of a fluorochemical nonionic surfactant Capstone (Trademarks) FS-34 having the formula (1) in which n is from 5 to 20 from Du Pont, 0.5 parts of 2,4,7,9-tetramethyl-4,7-decanediol, 5 parts of glycerin, 10 parts of 1,3-butanediol, 5 parts of 2-pyrollidone and 79.45 parts of water were mixed to obtain a cleaning liquid.

Example 15

1.25 parts of a fluorochemical nonionic surfactant Capstone (Trademarks) FS-34 having the formula (1) in which n is from 5 to 20 from Du Pont, 1 part of 2,4,7,9-tetramethyl-4,7-decanediol, 15 parts of glycerin, 15 parts of 1,3-butanediol and 67.75 parts of water were mixed to obtain a cleaning liquid.

Example 16

0.75 parts of a fluorochemical nonionic surfactant Capstone (Trademarks) FS-34 having the formula (1) in which n is from 5 to 20 from Du Pont, 0.55 parts of 2,4,7,9-tetramethyl-4,7-decanediol, 10 parts of glycerin, 15 parts of 3-methyl-1,3-butanediol, 5 parts of 2-pyrollidone and 68.7 parts of water were mixed to obtain a cleaning liquid.

Example 17

0.5 parts of a fluorochemical nonionic surfactant Capstone (Trademarks) FS-30 having the formula (1) in which n is from 6 to 22 from Du Pont, 0.1 parts of 2,4,7,9-tetramethyl-4,7-decanediol, 5 parts of glycerin, 20 parts of 1,3-butanediol and 74.4 parts of water were mixed to obtain a cleaning liquid.

Example 18

0.1 parts of a fluorochemical nonionic surfactant Capstone (Trademarks) FS-30 having the formula (1) in which n is from 6 to 22 from Du Pont, 0.4 parts of 2,4,7,9-tetramethyl-4,7-decanediol, 15 parts of glycerin, 15 parts of 1,3-butanediol and 69.5 parts of water were mixed to obtain a cleaning liquid.

Example 19

1 part of a fluorochemical nonionic surfactant Capstone (Trademarks) FS-3100 having the formula (1) in which n is from 7 to 17 from Du Pont, 0.2 parts of 2,4,7,9-tetramethyl-4,7-decanediol, 20 parts of glycerin, 5 parts of diethylene glycol and 73.8 parts of water were mixed to obtain a cleaning liquid.

Example 20

0.01 parts of a fluorochemical nonionic surfactant Capstone (Trademarks) FS-30 having the formula (1) in which n is from 6 to 22 from Du Pont, 0.2 parts of 2,4,7,9-tetramethyl-4,7-decanediol, 15 parts of glycerin, 15 parts of 3-methyl-1,3-butanediol and 69.79 parts of water were mixed to obtain a cleaning liquid.

Example 21

0.05 parts of a fluorochemical nonionic surfactant Capstone (Trademarks) FS-30 having the formula (1) in which n is from 6 to 22 from Du Pont, 0.5 parts of 2,4,7,9-tetramethyl-4,7-decanediol, 5 parts of glycerin, 10 parts of 1,3-butanediol, 5 parts of 2-pyrrolidone and 79.45 parts of water were mixed to obtain a cleaning liquid.

Example 22

1.25 parts of a fluorochemical nonionic surfactant Capstone (Trademarks) FS-30 having the formula (1) in which n is from 6 to 22 from Du Pont, 1 part of 2,4,7,9-tetramethyl-4,7-decanediol, 15 parts of glycerin, 15 parts of 1,3-butanediol and 67.75 parts of water were mixed to obtain a cleaning liquid.

Example 23

0.75 parts of a fluorochemical nonionic surfactant Capstone (Trademarks) FS-30 having the formula (1) in which n is from 6 to 22 from Du Pont, 0.55 parts of 2,4,7,9-tetramethyl-4,7-decanediol, 10 parts of glycerin, 15 parts of 3-methyl-1,3-butanediol, 5 parts of 2-pyrrolidone and 68.7 parts of water were mixed to obtain a cleaning liquid.

Comparative Example 1

0.5 parts of a fluorochemical nonionic surfactant Capstone (Trademarks) FS-3100 having the formula (1) in which n is from 7 to 17 from Du Pont, 5 parts of glycerin, 20 parts of 1,3-butanediol and 74.5 parts of water were mixed to obtain a cleaning liquid.

Comparative Example 2

0.5 parts of a nonionic surfactant UNISAFE A-LY (polyoxyethylene coconut oil alkyl dimethylamine oxide from NOF Corp.), 15 parts of glycerin, 5 parts of 2-pyrrolidone, 2 parts of 1,8-octanediol and 77.5 parts of water were mixed to obtain a cleaning liquid.

Comparative Example 3

1 part of an anionic surfactant ECTD-3NEX (polyoxyethylene (3) tridecylether sodium acetate Nikko Chemicals Co., Ltd.), 20 parts of glycerin, 5 parts of diethyleneglycol and 74 parts of water were mixed to obtain a cleaning liquid.

Comparative Example 4

0.5 parts of a fluorochemical nonionic surfactant Capstone (Trademarks) FS-30 having the formula (1) in which n is from 6 to 22 from Du Pont, 0.5 parts of N-octyl-2-pyrrolidone, 5 parts of glycerin, 20 parts of 1,3-butanediol and 74 parts of water were mixed to obtain a cleaning liquid.

Comparative Example 5

0.1 parts of $C_4F_9$—$CH_2CH(OH)CH_2O$—$(CH_2CH_2O)_{21}$—$C_{12}H_{25}$, 0.4 parts of N-octyl-2-pyrrolidone, 15 parts of glycerin, 15 parts of 3-methyl-1,3-butanediol and 69.5 parts of water were mixed to obtain a cleaning liquid.

Comparative Example 6

0.5 parts of an anionic surfactant ECTD-3NEX (polyoxyethylene (3) tridecylether sodium acetate Nikko Chemicals Co., Ltd.), 5 parts of glycerin, 10 parts of 1,3-butanediol, 5 parts of 2-pyrrolidone and 79.5 parts of water were mixed to obtain a cleaning liquid.

Comparative Example 7

0.5 parts of an ampholytic surfactant NISSANANON BL-SF (betaine lauryldimethylamino acetate from NOF Corp.), 5 parts of glycerin, 10 parts of 1,3-butanediol, 2 parts of 1,8-octanediol and 82.5 parts of water were mixed to obtain a cleaning liquid.

Comparative Example 8

0.5 parts of fluorochemical nonionic surfactant Zonyl FS-300 including an effective component which is a compound having the following formula of 40% by weight from Du Pont, 5 parts of glycerin, 10 parts of 1,3-butanediol, 2 parts of 1,8-octanediol and 82.5 parts of water were mixed to obtain a cleaning liquid.

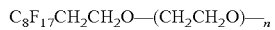

$C_8F_{17}CH_2CH_2O$—$(CH_2CH_2O)$—$_n$ wherein n is an integer of from 1 to 40.

Comparative Example 9

1 part of fluorochemical nonionic surfactant Zonyl FS-300 including an effective component of 40% by weight from Du Pont, 5 parts of glycerin, 10 parts of 1,3-butanediol, 2 parts of 1,8-octanediol and 82 parts of water were mixed to obtain a cleaning liquid.

Comparative Example 10

0.2 parts of an anionic surfactant ECTD-3NEX (polyoxyethylene (3) tridecylether sodium acetate Nikko Chemicals Co., Ltd.), 5 parts of diethyleneglycol, 10 parts of 1,3-butanediol, 5 parts of 2-pyrrolidone and 79.8 parts of water were mixed to obtain a cleaning liquid.

Comparative Example 11

Water was used as a cleaning liquid.
Next, uniformity, defoamability, mixability with ink, and cleanability and filling ability of the ink were evaluated.
<Uniformity>
The cleaning liquid after it stood still for 1 hr was visually observed to evaluate the uniformity thereof.
Good: no separation of component and no undissolved substance
Poor: separation of component or undissolved substance
<Defoamability>
In an environment of 25° C., after 10 mL of the cleaning liquid was placed in a measuring cylinder of 100 mL, air having a constant pressure was injected therein until the cleaning liquid and air bubbles had a volume of 100 mL and a time until all the foams disappeared was measured to evaluate defoamability.
AA: less than 60 sec
A: not less than 60 sec and less than 150 sec
B: not less than 150 sec and less than 300 sec
C: not less than 300 sec and less than 600 sec
D: not less than 600 sec
<Mixability with Ink>
97 parts of the cleaning liquid and 3 parts of an ink were mixed, and then the mixture was left for 50 hours at 65° C. Change of appearance was evaluated by visual contact in accordance with criteria shown below.
Good: separation was not observed
Fair: shading was observed
Poor: separation was observed
<Ink Cleanability>
Using inkjet printer (IPSIO GX3000, manufactured by Ricoh Company Limited), the inkjet ink in ink flow channel and head was replaced to purified water. Then, both of the black ink cartridge and cyan ink cartridge were replaced to the ink cartridges that contain the aforementioned magenta ink for evaluation respectively. Similarly, both of the magenta ink cartridge and yellow ink cartridge were replaced to the ink cartridges that contain the aforementioned yellow ink for evaluation respectively. After filling operation, head refreshing operations were subjected for 10 times to replace from the inkjet ink in the ink flow channel and head to the inkjet ink for evaluation. Then, nozzle check pattern was printed and head refreshing operations were subjected until defective pixel was not observed. Next, all cartridges were replaced to the cartridges which contain the cleaning liquid, and then head refreshing operations were subjected for 6 times. Then, maintenance unit was activated to absorb 4.5 cc of cleaning liquid from the head for 3 times. After filling the cleaning liquid again, 2 cc of the cleaning liquid was absorbed from the head, and then nozzle surface was wiped for cleaning a channel in the inkjet printer. Using the cleaning liquid which was absorbed at the last time, absorption of light was measured at 563 nm for the magenta or at 421 nm for the yellow. The amount of the fine particle as a colorant of the inkjet ink (% by weight) in the cleaning liquid was calculated by comparing the result with absorption of light of the ink jet inks at each same wave length. The cleanability was evaluated based on following criteria.
Good: less than 2.00% by weight
Fair: not less than 2.00% by weight, but less than 4.00% by weight
Poor: not less than 4.00% by weight
<Ink Filling Ability>
Using inkjet printer (IPSIO GX3000, manufactured by Ricoh Company Limited), the ink flow channel and head of the inkjet printer were cleaned with the cleaning filling liquid, and then same cleaning filling liquid was filled. After the nozzle was capped, the inkjet printer was left for 1 month at 50° C. and 60% RH. Then, the ink cartridges, that contain the aforementioned yellow ink or magenta ink for evaluation, were set, and ink filling operation was subjected. After, nozzle check pattern was printed, head refreshing operations were repeated. The ink filling ability was evaluated based on the number of head refreshing operations, until which the jetting defect was not observed.

Good: head refreshing twice or less
Fair: head refreshing 3 to 4 times
Poor: head refreshing 5 times or more The evaluation results are shown in Table 1. Since the cleaning liquid of Comparative Example 3 had poor mixability with ink, the ink cleanability and filling ability were omitted.

TABLE 1

(1)

|  | Uniformity | Defoamability | Mixability with Ink | |
|---|---|---|---|---|
|  |  |  | Yellow | Magenta |
| Example 1 | Good | B | Good | Good |
| Example 2 | Good | AA | Good | Good |
| Example 3 | Good | B | Good | Good |
| Example 4 | Good | AA | Good | Good |
| Example 5 | Good | AA | Good | Good |
| Example 6 | Good | AA | Good | Good |
| Example 7 | Good | B | Good | Good |
| Example 8 | Good | B | Good | Good |
| Example 9 | Good | B | Good | Good |
| Example 10 | Good | AA | Good | Good |
| Example 11 | Good | AA | Good | Good |
| Example 12 | Good | A | Good | Good |
| Example 13 | Good | AA | Good | Good |
| Example 14 | Good | AA | Good | Good |
| Example 15 | Good | A | Good | Good |
| Example 16 | Good | A | Good | Good |
| Example 17 | Good | B | Good | Good |
| Example 18 | Good | AA | Good | Good |
| Example 19 | Good | B | Good | Good |
| Example 20 | Good | AA | Good | Good |
| Example 21 | Good | AA | Good | Good |
| Example 22 | Good | B | Good | Good |
| Example 23 | Good | B | Good | Good |
| Comparative Example 1 | Good | D | Good | Good |
| Comparative Example 2 | Good | D | Fair | Fair |
| Comparative Example 3 | Good | D | Poor | Poor |
| Comparative Example 4 | Good | D | Good | Good |
| Comparative Example 5 | Good | A | Good | Good |
| Comparative Example 6 | Good | D | Fair | Fair |
| Comparative Example 7 | Good | D | Fair | Fair |
| Comparative Example 8 | Good | D | Good | Good |
| Comparative Example 9 | Good | D | Good | Good |
| Comparative Example 10 | Good | D | Fair | Fair |
| Comparative Example 11 | Good | AA | Good | Good |

(2)

|  | Ink Cleanability (yellow) | | Ink Cleanability (magenta) | | Ink Filling Ability | |
|---|---|---|---|---|---|---|
|  | Concentration (% by weight) | Result | Concentration (% by weight) | Result | Yellow | Magenta |
| Example 1 | 1.46 | Good | 1.56 | Good | Good | Good |
| Example 2 | 1.65 | Good | 1.65 | Good | Good | Good |
| Example 3 | 1.38 | Good | 1.41 | Good | Good | Good |
| Example 4 | 1.95 | Good | 1.91 | Good | Good | Good |
| Example 5 | 1.85 | Good | 1.76 | Good | Good | Good |
| Example 6 | 1.79 | Good | 1.86 | Good | Good | Good |
| Example 7 | 1.26 | Good | 1.34 | Good | Good | Good |
| Example 8 | 1.37 | Good | 1.39 | Good | Good | Good |
| Example 9 | 1.22 | Good | 1.29 | Good | Fair | Fair |

TABLE 1-continued

| | | | | | | |
|---|---|---|---|---|---|---|
| Example 10 | 1.39 | Good | 1.48 | Good | Good | Good |
| Example 11 | 1.50 | Good | 1.54 | Good | Good | Good |
| Example 12 | 1.22 | Good | 1.38 | Good | Good | Good |
| Example 13 | 1.72 | Good | 1.86 | Good | Good | Good |
| Example 14 | 1.71 | Good | 1.69 | Good | Good | Good |
| Example 15 | 1.21 | Good | 1.28 | Good | Good | Good |
| Example 16 | 1.22 | Good | 1.23 | Good | Good | Good |
| Example 17 | 1.48 | Good | 1.56 | Good | Good | Good |
| Example 18 | 1.63 | Good | 1.70 | Good | Good | Good |
| Example 19 | 1.36 | Good | 1.45 | Good | Good | Good |
| Example 20 | 1.92 | Good | 1.96 | Good | Good | Good |
| Example 21 | 1.91 | Good | 1.82 | Good | Good | Good |
| Example 22 | 1.24 | Good | 1.36 | Good | Good | Good |
| Example 23 | 1.21 | Good | 1.31 | Good | Good | Good |
| Comparative Example 1 | 1.69 | Good | 1.53 | Good | Fair | Fair |
| Comparative Example 2 | 5.33 | Poor | 5.26 | Poor | Poor | Poor |
| Comparative Example 3 | — | — | — | — | — | — |
| Comparative Example 4 | 1.78 | Good | 1.86 | Good | Fair | Fair |
| Comparative Example 5 | 2.26 | Fair | 2.51 | Fair | Fair | Fair |
| Comparative Example 6 | 5.23 | Poor | 5.16 | Poor | Poor | Poor |
| Comparative Example 7 | 4.53 | Poor | 5.36 | Poor | Poor | Poor |
| Comparative Example 8 | 1.97 | Good | 1.85 | Good | Poor | Poor |
| Comparative Example 9 | 1.87 | Good | 1.95 | Good | Poor | Poor |
| Comparative Example 10 | 4.92 | Poor | 4.65 | Poor | Poor | Poor |
| Comparative Example 11 | 5.89 | Poor | 4.65 | Poor | Poor | Poor |

Table 1 proves the cleaning liquids of Examples 1 to 23 have good uniformity, defoamability, mixability with ink, and cleanability and filling ability of the ink.

Including no compound having the formula (2), the cleaning liquids of Comparative Examples 1 and 4 have lower defoamability and slightly lower ink filling ability.

Including neither the compound having the formula (1) nor the compound having the formula (2), and a non-fluorochemical surfactant, the cleaning liquids of Comparative Examples 2, 6, 7 and 10 have lower defoamability, lower ink cleanability and filling ability, and slightly lower mixability with ink.

Including no compound having the formula (1) and a non-fluorochemical surfactant, the cleaning liquid of Comparative Example 3 has lower mixability with ink.

Including no compound having the formula (1) and a fluorochemical surfactant, the cleaning liquid of Comparative Example 5 has lower ink cleanability.

Including neither the compound having the formula (1) nor the compound having the formula (2), and a fluorochemical surfactant, the cleaning liquids of Comparative Examples 8 and 9 have lower defoamability and ink filling ability.

Being water, the cleaning liquid of Comparative Example 11 has lower ink cleanability and filling ability.

Having now fully described the invention, it will be apparent to one of ordinary skill in the art that many changes and modifications can be made thereto without departing from the spirit and scope of the invention as set forth therein.

What is claimed is:

1. A cleaning liquid used for cleaning an ink flow channel in an inkjet recorder, comprising:
    water;
    a hydrosoluble organic solvent;
    a compound having the following formula (1):

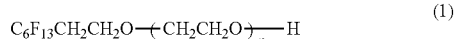

wherein n represents an integer of from 1 to 40; and
    a compound having the following formula (2):

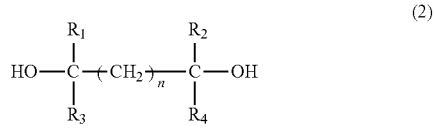

wherein $R_1$ and $R_2$ independently represent an alkyl group having 3 to 6 carbon atoms; $R_3$ and $R_4$ independently represent a methyl group or an ethyl group; and n represents an integer of from 1 to 6.

2. The cleaning liquid of claim 1, wherein the liquid comprises the compound having the following formula (1) in an amount of from 0.05 to 1% by weight.

3. The cleaning liquid of claim 1, wherein the liquid comprises the compound having the following formula (2) in an amount of from 0.1 to 0.5% by weight.

4. A cartridge detachable from an inkjet recorder, containing the cleaning liquid according to claim 1.

5. A method of cleaning an ink flow channel in an inkjet recorder, comprising:
    providing the ink flow channel with the cleaning liquid according to claim 1.

6. The method of claim 5, wherein the ink flow channel is filled with an ink comprising a colorant, water, a hydrosoluble organic solvent and a surfactant.

* * * * *